United States Patent
Reid

(10) Patent No.: US 7,313,231 B2
(45) Date of Patent: Dec. 25, 2007

(54) METHODS, APPARATUS AND COMPUTER PROGRAM PRODUCTS FOR ROUTING PHONE CALLS TO A PSTN OR A PACKET SWITCHED NETWORK BASED ON CALLED NUMBER

(75) Inventor: Laura Reid, Alpharetta, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 288 days.

(21) Appl. No.: 10/653,670

(22) Filed: Sep. 2, 2003

(65) Prior Publication Data

US 2005/0047574 A1 Mar. 3, 2005

(51) Int. Cl.
*H04M 3/42* (2006.01)
(52) U.S. Cl. ............ 379/221.01; 379/33; 379/37; 379/93.01; 379/93.07; 379/106.01; 379/221.02; 379/221.03; 379/221.14; 379/207.14; 379/211.01; 379/211.02; 379/212.01; 370/351; 370/352; 370/353; 370/354; 370/355; 370/356
(58) Field of Classification Search ............ 379/33, 379/37, 93.01, 93.07, 106.01, 221.01, 221.02, 379/221.03, 221.14, 207.14, 211.01, 211.02, 379/212.01; 370/351, 352, 353, 354, 355, 370/356
See application file for complete search history.

(56) References Cited

U.S. PATENT DOCUMENTS

| | | | |
|---|---|---|---|
| 6,529,500 B1 | 3/2003 | Pandharipande | 370/352 |
| 6,614,781 B1 | 9/2003 | Elliott et al. | 370/352 |
| 6,661,785 B1 | 12/2003 | Zhang et al. | 370/352 |
| 6,665,293 B2 * | 12/2003 | Thornton et al. | 370/352 |
| 6,771,742 B2 * | 8/2004 | McCalmont et al. | 379/45 |
| 6,792,081 B1 * | 9/2004 | Contractor | 379/45 |
| 6,798,772 B2 * | 9/2004 | Bergman et al. | 370/354 |
| 2001/0005372 A1 | 6/2001 | Cave et al. | 370/405 |
| 2001/0043684 A1 | 11/2001 | Guedalia et al. | 379/88.17 |
| 2002/0059374 A1 | 5/2002 | Nuestro | 709/204 |
| 2002/0101860 A1 | 8/2002 | Thornton et al. | 370/352 |
| 2003/0002479 A1 * | 1/2003 | Vortman et al. | |
| 2003/0223403 A1 * | 12/2003 | Higgins | |
| 2004/0101123 A1 | 5/2004 | Garcia | 379/220.01 |
| 2004/0218583 A1 * | 11/2004 | Adan et al. | |
| 2004/0240430 A1 * | 12/2004 | Lin et al. | |
| 2004/0248595 A1 * | 12/2004 | Hicks, III et al. | |
| 2005/0041795 A1 * | 2/2005 | Goldstein et al. | |
| 2005/0073995 A1 * | 4/2005 | Yeh et al. | |

* cited by examiner

*Primary Examiner*—Quynh H. Nguyen
(74) *Attorney, Agent, or Firm*—Myers Bigel Sibley & Sajovec, P.A.

(57) ABSTRACT

A phone call is selectively routed to a public switched telephone network or to a packet switched network based on a called number to which the phone call is directed. A phone call may be made as a Voice-Over-Internet-Protocol call through, for example, the Internet except when a user dials an emergency number, in which case the call is made to the public switched telephone network.

16 Claims, 2 Drawing Sheets

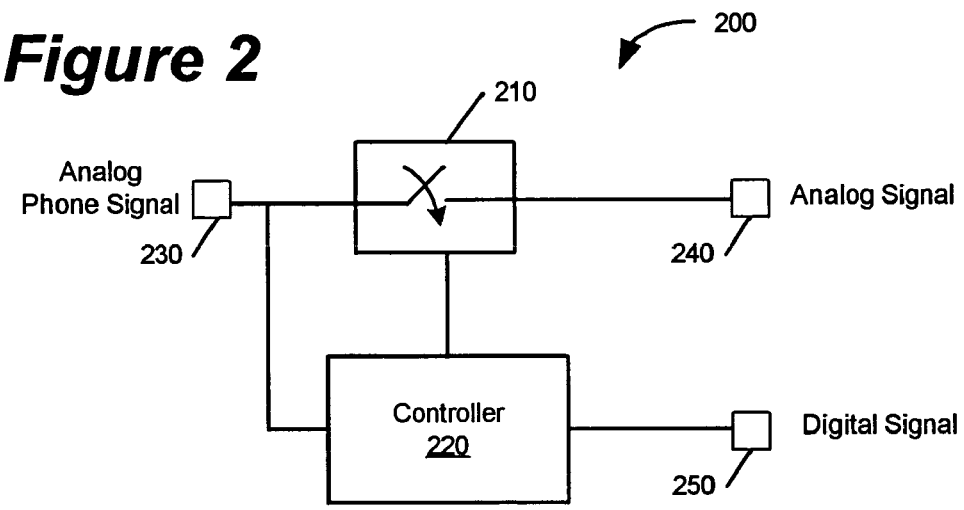
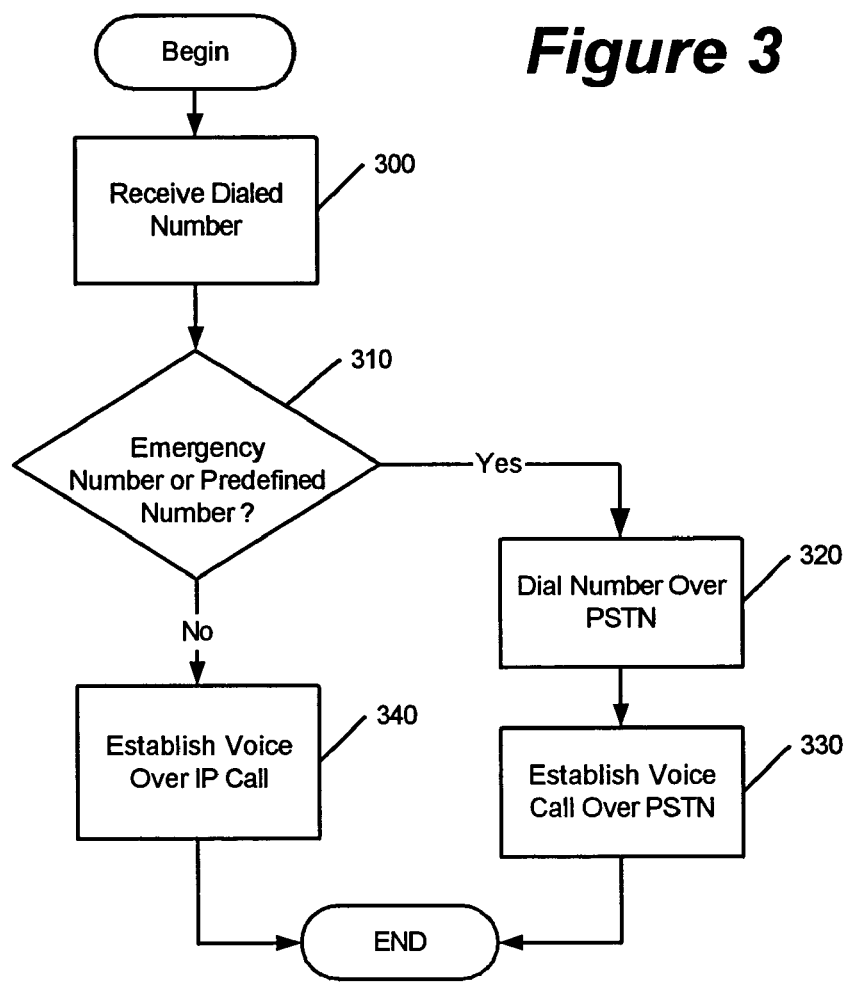

METHODS, APPARATUS AND COMPUTER PROGRAM PRODUCTS FOR ROUTING PHONE CALLS TO A PSTN OR A PACKET SWITCHED NETWORK BASED ON CALLED NUMBER

FIELD OF THE INVENTION

The present invention generally relates to the field of switched telephony, and more particularly to apparatus, methods, and computer program products for providing voice communications over the Internet.

BACKGROUND OF THE INVENTION

The Internet has become a mainstream network for communicating not just data, such as email and pictures, but also for providing real-time bi-directional voice communications. Voice-Over-Internet-Protocol (VoIP) is an industry standard that has evolved to enable users to place phone calls through the Internet, instead of through the Public Switched Telephone Network (PSTN). A conventional phone may now be connected to the Internet using an interface device that converts analog phone signals to digital signals that can be communicated through the Internet. A phone call may thereby be communicated through the Internet to a VoIP provider, who converts the call back to an analog signal and places the call through a PSTN that is local to the called phone. A user can thereby dial a telephone number in a conventional manner and have the call routed through the Internet, instead of through the PSTN.

However, some telephone services may only be available to users who make calls through the PSTN, and may not be available if the calls are instead made through the Internet. For example, when a user places a call to an emergency number, such as a "911" call, through the PSTN, the emergency call is routed to a local emergency response center. The location of the caller and the phone number of the calling phone may be automatically communicated to emergency personnel.

SUMMARY OF THE INVENTION

Embodiments of the present invention route calls in a communication system. A phone call is selectively routed to a public switched telephone network (PSTN) or to a packet switched network based on a called number to which the phone call is directed. For example, a phone call may be selectively routed as an analog signal to the PSTN, or routed as a digital signal to a packet switched network via, for example, a cable modem device, a digital subscriber line (DSL) modem device, and/or another narrow or broadband network interface device. A phone call may be selectively routed based on whether the called number corresponds to one or more predefined numbers. A predefined number may correspond to an emergency number, such as "911".

Accordingly, in some embodiments of the present invention, phone calls may be made as Voice-Over-Internet-Protocol (VoIP) calls through, for example, the Internet except when a user dials an emergency number, in which case the call is made to the PSTN. An emergency call may thereby be routed to a local emergency response center, which may allow emergency personnel to automatically determine the location of the caller and telephone number of the phone.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIG. 2 is a diagram of a phone adapter according to various embodiments of the present invention.

FIG. 3 is a flow chart illustrating operations for routing calls according to various embodiments of the present invention.

DETAILED DESCRIPTION OF THE INVENTION

Figure 1:
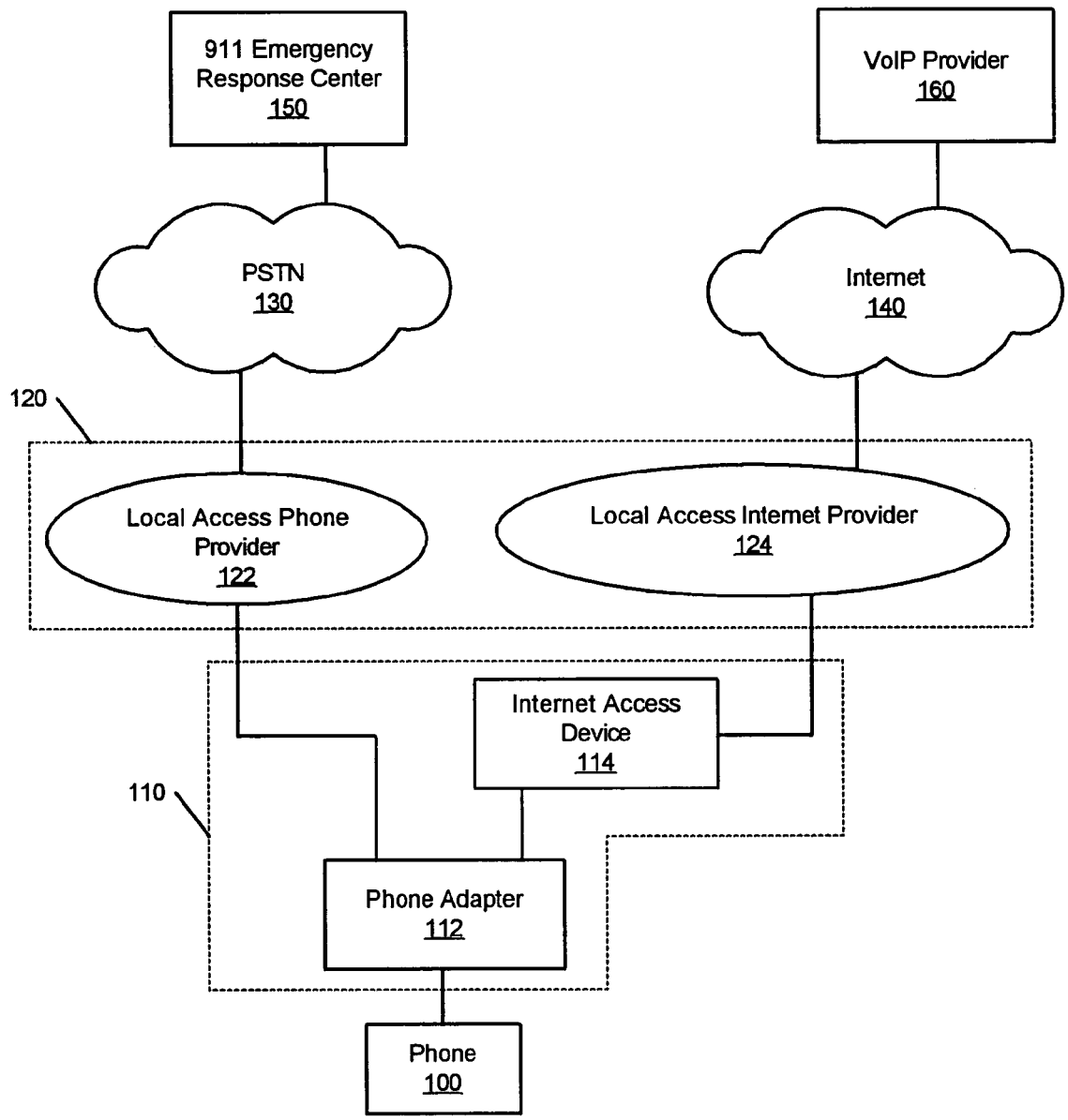
FIG. 1 is a block diagram of communications systems according to various embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions.

The present invention is described below with reference to block diagrams and/or operational illustrations of methods and systems according to embodiments of the invention. It is understood that each block of the block diagrams and/or operational illustrations, and combinations of blocks in the block diagrams and/or operational illustrations, can be implemented by analog and/or digital hardware, and/or computer program instructions. These computer program instructions may be provided to a processor of a general purpose computer, special purpose computer, ASIC, and/or other programmable data processing apparatus in a system, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

FIG. 1 is a block diagram of communications systems for routing calls between communication devices according to various embodiments of the present invention. A phone 100 is connected to a phone-network interface 110 that selectively routes calls from the phone 100, via a local access network 120, through a public switched telephone network (PSTN) 130 or a packet switched network, which for purposes of illustration only, is referred to as the Internet 140. The local access network 120 may include a local access phone provider 122 and a local access Internet provider 124. The local access phone provider 122 may be a local end office that switches calls between the phone 100 and other communication devices that are connected to the PSTN 130. The local access Internet provider 124 provides a local interface between the phone-network interface 110 and other communication devices that are connected to the Internet 140.

The local access phone provider 122 and the local access Internet provider 124 may be the same entity. For example, phone and Internet access may provided by a local telephone company using a digital subscriber line (DSL) wherein analog phone calls are combined with digital data, and later separated and routed through the PSTN 130 and the Internet 140, respectively. Alternatively, phone and Internet access may be provided by different entities. For example, a local phone company may service analog phone lines that are connected to the phone-network interface 110, and a cable TV/communications company may service digital cable lines that are also connected to the phone-network interface 110. The phone-network interface 110 may also be connected to PSTN 130 and/or the Internet 140 via a wireless interface, such as through a cellular operator.

The phone-network interface 110 may include a phone adapter 112 and an Internet access device 114. The Internet access device 114 may be, for example, a cable modem device and/or a DLS modem device that provides a data communication interface with the local access Internet provider 124. The phone adapter 112 selectively routes phone calls from the phone 100 based on the called number. For example, when a called number corresponds to one or more predefined numbers, the phone call is routed through the PSTN 130, via the local access phone provider 122, to another communication device. Otherwise, the phone call is routed through the Internet 140, via the Internet access device 114 and the local access Internet provider 124, to a Voice-Over-Internet-Protocol (VoIP) provider 160. The VoIP provider 160 may then route the call to an end office that is local to the called phone. The predefined numbers that are used for routing calls may be defined by a user, such as by entering a programming sequence and the desired numbers through a keypad on the phone 100, and/or may be received from another device, such as the VoIP provider 160.

Accordingly, in some embodiments of the present invention, phone calls may be made as VoIP calls through the Internet, except when a user dials an emergency number, such as "911". Emergency calls are automatically routed through the PSTN 130, instead of through the Internet 140. Emergency calls may thereby be made to a local emergency response center 150, which may allow emergency personnel to determine the location of the caller and telephone number of the calling phone.

Although FIG. 1 illustrates an exemplary phone-network interface 110, it will be understood that the present invention is not limited to such a configuration, but is intended instead to encompass any configuration capable of carrying out the operations described herein. For example, although the phone adapter 112 and the Internet access device 114 are shown as separate devices, they may be configured as one or more devices. Moreover, the phone 100 and the phone-network interface 110, and/or the phone adapter 112 and the Internet access device 114 may be a configured to communicate across a wireless interface such as, for example, a cellular interface, a wireless local area network interface (WLAN), a Bluetooth interface, another RF communication interface, and/or an optical interface. As used herein, a "phone" includes, but is not limited to, a device that is configured to establish a call across a PSTN such as, for example, a device that may be connected to a Plain Old Telephone System (POTS) and communicates using analog signals (e.g., telephone, personal computer, radio, television, and/or radio/television tuner and/or recorder), and a wireless terminal such as, for example, a cellular terminal that may communicate through a PSTN via a wireless base station and a mobile switching office.

FIG. 2 shows a phone adapter 200 that is configured according to some embodiments of the present invention, and which may be used as the phone adapter 112 shown in FIG. 1. The phone adapter 200 includes a switch 210, a controller 220, a phone interface 230, a PSTN interface 240, and an Internet interface 250. The phone interface 230 and the PSTN interface 240 are configured to be communicatively connected to the phone 100 and to the PSTN 130, respectively, and may be standard RJ11 connectors. The Internet interface 250 is configured to be communicatively connected to Internet 140 via the Internet access device 114. For example, the Internet network interface 250 may be a cable connection that can be coupled to a cable modem device, and/or may be a RJ11 connector that may be coupled to a DSL modem device. Although the switch 210 and the controller 220 are shown as separate devices, they may be configured as a single device and/or may operate as software on a data processing unit.

The controller 220 senses a called number in a signal from the phone interface 230. The signal may be an analog phone signal, and the controller 220 may be configured to sense dual-tone multi-frequency (DTMF) formatted numbers and/or dial pulse formatted numbers. The switch 210 selectively passes a signal from the phone interface 230 to the PSTN interface 240 based on a control signal from the controller 220. For example, if the dialed number corresponds to one or more predefined numbers, the controller 220 controls the switch 210 to connect the phone interface 230 to the PSTN interface 240, and thereby route a call from a phone to a PSTN. If the switch 210 is normally-open until it is closed by the controller 220, a dialed phone number is blocked from the PSTN interface 240. Consequently, the controller 220 may take the PSTN interface 240 "off-hook" and dial the phone number after the controller 220 has determined that the dialed number corresponds to one or more predefined numbers.

The controller 220 is also configured to interface the phone 100 with a packet switched network, such as the Internet 140, through the Internet access device 114. In some embodiments of the present invention, when a dialed number does not correspond to one or more predefined numbers, the controller 220 coverts an analog phone signal to a digital signal and establishes a VoIP call through the Internet access device 114 and the VoIP provider 160. The operation and configuration for establishing a VoIP call through an Internet access device and a VoIP provider are well known to those skilled in the art and will not be further described herein.

FIG. 3 is flow chart of operations for routing phone calls according to some embodiments of the present invention. At Block 300, a dialed phone number is received. At Block 310, a determination is made as to whether the phone number corresponds to a predefined number (e.g., an emergency number and/or a predefined number), and, if so, at Block 320 the phone number is provided to a PSTN, and at Block 330 a voice call is established through the PSTN. When the phone number does not correspond to the predefined number, a voice call is established over a packet switched network at Block 340.

In the drawings and specification, there have been disclosed typical preferred embodiments of the invention and, although specific terms are employed, they are used in a That which is claimed:

1. A method of routing phone calls in a communication system, the method comprising:
   within a phone network interface that is separate from a local access phone provider and from a local access Internet provider, selectively carrying out based on a called number to which a phone call is directed: 1) routing an analog signal of the phone call received from a phone through an analog phone line for communication to the local access phone provider and across a public switched telephone network (PSTN); or 2) converting the analog signal from the phone to a digital Voice-Over-Internet-Protocol (VoIP) phone call signal and routing the digital VoIP phone call signal to a broadband network modem device for communication to the local access Internet provider and across a packet switched network.

2. The method of claim 1, wherein converting the analog signal from the phone to a digital VoIP phone call signal comprises routing the digital VoIP phone call signal from the phone network interface to a cable modem device for communication to the local access Internet provider.

3. The method of claim 1, wherein converting the analog signal from the phone to a digital VoIP phone call signal comprises routing the digital VoIP phone call signal from the phone network interface through a digital subscriber line (DSL) modem device for communication to the local access Internet provider.

4. The method of claim 1, wherein routing an analog signal of the phone call received from a phone through an analog phone line for communication to a local access phone provider is carried out when the called number corresponds to at least one predefined number.

5. The method of claim 4, wherein converting the analog signal from the phone to a digital VoIP phone call signal and routing the digital VoIP phone call signal to a broadband network modem device is carried out when the called number does not correspond to the at least one predefined number.

6. The method of claim 4, wherein the predefined number is 911.

7. The method of claim 1, wherein routing an analog signal of the phone call received from a phone through an analog phone line for communication to a local access phone provider is carried out when the called number corresponds to an emergency number, and converting the analog phone call signal to a digital VoIP phone call signal and routing the digital VoIP phone call signal to a broadband network modem device is carried out when the called number does not correspond to an emergency number.

8. The method of claim 1, wherein:
   wherein routing an analog signal of the phone call received from a phone through an analog phone line for communication to a local access phone provider comprises establishing an analog connection between a phone and the PSTN; and
   converting the analog signal from the phone to a digital VoIP phone call signal and routing the digital VoIP phone call signal to a broadband network modem device comprises establishing a digital connection between the phone and the packet switched network.

9. The method of claim 8, further comprising selectively converting the analog signal from the phone to a digital signal based on the called number.

10. The method of claim 1, further comprising selectively providing the called number to the PSTN or the packet switched network based on the called number.

11. The method of claim 1, wherein converting the analog signal from the phone to a digital VoIP phone call signal and routing the digital VoIP phone call signal to a broadband network modem device further comprises routing the VoIP phone call to a Voice-Over-Internet-Protocol (VoIP) provider.

12. A phone adapter comprising:
   a phone interface that is configured to be communicatively connected to a phone via an analog phone line;
   a PSTN interface that is configured to be communicatively connected to a public switched telephone network (PSTN) via an analog phone line, wherein the PSTN interface is separate from a local access phone provider;
   an Internet interface that is configured to be communicatively connected to a broadband network interface device that can be communicatively connected to the Internet, wherein the Internet interface is separate from a local access Internet provider; and
   a controller that is configured to selectively: 1) route an analog phone call signal, which is received through the phone interface from a phone, through the PSTN interface and an analog phone line to the local access phone provider or 2) convert the analog phone call signal to a digital Voice-Over-Internet-Protocol (VoIP) phone call signal and route the digital VoIP phone call signal through the Internet interface to the broadband network interface device to the local access Internet provider for communication across a packet switched network based on a called number to which the phone call is directed.

13. The phone adapter of claim 12, wherein the controller is configured to route the VoIP phone call through a cable modem device to the local access Internet provider.

14. The phone adapter of claim 12, wherein the controller is configured to route the VoIP phone call through a digital subscriber line (DSL) modem device to the local access Internet provider.

15. The phone adapter of claim 12, wherein the controller is configured to route the phone call through the PSTN interface and the analog phone line to the local access phone provider for communication across the PSTN when the called number corresponds to at least one predefined number.

16. The phone adapter of claim 12, wherein the controller is configured to determine whether the called number corresponds to at least one predefined number, and further comprising a switch that is configured to selectively pass the analog phone call signal from the phone interface through the PSTN interface based on the determination by the controller.

* * * * *